(12) United States Patent
White et al.

(10) Patent No.: US 6,745,153 B2
(45) Date of Patent: Jun. 1, 2004

(54) DATA COLLECTION AND MANIPULATION APPARATUS AND METHOD

(75) Inventors: Tommy E. White, Rochester Hills, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/303,678

(22) Filed: Nov. 25, 2002

(65) Prior Publication Data

US 2003/0137194 A1 Jul. 24, 2003

Related U.S. Application Data

(60) Provisional application No. 60/333,554, filed on Nov. 27, 2001.

(51) Int. Cl.[7] .................................................. G06F 11/38
(52) U.S. Cl. .................... 702/184; 702/34; 702/179; 702/182; 702/183; 702/185; 714/31; 701/29; 701/30; 701/33; 701/35; 340/438; 340/459
(58) Field of Search ............................... 701/29, 30, 33, 701/35; 340/438, 459; 714/31; 702/179, 182, 183, 184, 185, 34

(56) References Cited

U.S. PATENT DOCUMENTS

| | | | | |
|---|---|---|---|---|
| 4,258,421 A | * | 3/1981 | Juhasz et al. | 701/35 |
| 4,271,402 A | | 6/1981 | Kastura et al. | 340/52 |
| 4,277,772 A | | 7/1981 | Kastura et al. | 340/5 |
| 5,210,704 A | * | 5/1993 | Husseiny | 702/34 |
| 5,710,723 A | * | 1/1998 | Hoth et al. | 702/181 |
| 5,737,215 A | * | 4/1998 | Schricker et al. | 700/29 |
| 5,950,147 A | * | 9/1999 | Sarangapani et al. | 702/179 |
| 6,016,994 A | * | 1/2000 | Maino et al. | 244/17.13 |
| 6,028,537 A | * | 2/2000 | Suman et al. | 340/988 |
| 6,199,018 B1 | | 3/2001 | Quist et al. | 702/34 |
| 6,226,597 B1 | * | 5/2001 | Eastman et al. | 702/34 |
| 6,330,499 B1 | | 12/2001 | Chou et al. | 701/33 |
| 6,405,108 B1 | * | 6/2002 | Patel et al. | 701/29 |
| 6,411,908 B1 | * | 6/2002 | Talbott | 702/34 |
| 6,421,791 B1 | | 7/2002 | Cocco et al. | 714/31 |
| 6,442,511 B1 | * | 8/2002 | Sarangapani et al. | 702/194 |

* cited by examiner

*Primary Examiner*—John Barlow
*Assistant Examiner*—Anthony T Dougherty
(74) *Attorney, Agent, or Firm*—Kathryn A. Marra

(57) ABSTRACT

A vehicle maintenance system predicts potential failure of a component or system using statistical data and methods. The maintenance system preferably includes a communications apparatus for communicating component or system performance data to an offboard network or data collection device. Methods for advantageously using the collected performance data are also provided.

38 Claims, 3 Drawing Sheets

DATA COLLECTION AND MANIPULATION APPARATUS AND METHOD

CROSS-REFERENCE TO RELATED APPLICATION

This application claims the benefit of U.S. Provisional Application 60/333,554, filed Nov. 27, 2001, which is hereby incorporated by reference in its entirety.

TECHNICAL FIELD

The present invention relates to data collection and manipulation apparatuses and methods that involve analysis of performance data and statistical data to determine an indication of the remaining useful life of a component or system.

BACKGROUND OF THE INVENTION

The prior art includes onboard vehicle diagnostics systems that monitor vehicular components and systems. The prior art onboard diagnostics systems compare performance data obtained from monitored components and systems to stored values to determine if a predetermined fault condition is present. Prior art onboard vehicle diagnostics systems are not optimized, in part, because they merely report the presence of a parameter outside of an acceptable range. They do not have the ability to predict a potential fault condition or failure until after the monitored component or system has undergone degradation sufficient to result in performance data outside of the acceptable range. Furthermore, prior art onboard vehicle diagnostics systems do not provide for facilitated reprogramming of the stored values, in the event that a manufacturer obtains more accurate information for determining the presence of a fault condition.

Vehicle manufacturers do not have a regular, reliable means of tracking the field behavior and degradation of vehicular components and systems. Often, manufacturers obtain information about components or systems in the field, if at all, only after a fault condition is detected or a failure has occurred. The ability to observe the behavior and degradation of vehicular components and systems in the field, as the components and systems are being operated, would provide significant advantages to vehicle manufacturers.

SUMMARY OF THE INVENTION

A maintenance system for a vehicle including a component or system having a measurable characteristic is provided. The maintenance system includes a sensor configured and positioned with respect to the component or system to measure, and thereby obtain a value for, the measurable characteristic. A database located on a storage medium contains statistical data concerning the potential failure of the component or system with respect to, or as a function of, the measurable characteristic.

The sensor transmits a signal indicating the value of the measurable characteristic to a microprocessor. The microprocessor is configured to retrieve the statistical data from the storage medium, and to analyze the value of the measurable characteristic and the statistical data to calculate or otherwise determine an indication of the remaining useful life of the component or system. The microprocessor is configured to transmit the indication of the remaining useful life of the component or system to a user interface. The maintenance system may predict potential component or system failure prior to significant degradation of the component or system.

Preferably, the maintenance system includes a communications apparatus for transmitting values of the measurable characteristic to an offboard network or data collection device, and for receiving updated statistical data. The maintenance system is thus able to regularly communicate performance data of the component or system to an offboard network for use by a manufacturer or others.

An apparatus for collection and manipulation of performance data from a plurality of remotely located vehicular components or systems is also provided. A communications apparatus is configured to receive performance data, including a value of a measurable characteristic, the presence or absence of a predetermined fault condition and a unique identifier of the component or system from which the performance data is received, from the plurality of remotely located components or systems. The communications apparatus is operatively connected to a data storage medium configured to store the performance data in a database. A central processing unit operatively connected to the database is configured to generate statistical data from the stored performance data.

The collection of performance data by the apparatus provides a valuable source of information concerning the behavior of the components or systems in field use. The apparatus may be used to predict a potential failure of a particular component or system, to observe and learn about the degradation of the components or systems, and to update statistical data. Correspondingly, a method for advantageously collecting and employing the performance data is provided.

The method includes collecting performance data from a plurality of remotely-located components or systems. The performance data from each component or system includes a value of a first measurable characteristic of the component or system, a unique component or system identifier, and the presence or absence of a fault condition. The method also includes storing the performance data in a first database, and maintaining a second database containing a first set of statistical data concerning the potential failure of the components or systems in relation to, or as a function of, the first measurable characteristic, the first set of statistical data being derived from testing of similar components or systems.

The above objects, features, and advantages, and other objects features, and advantages, of the present invention are readily apparent from the following detailed description of the best modes for carrying out the invention when taken in connection with the accompanying drawings.

DESCRIPTION OF THE PREFERRED EMBODIMENTS

Figure 1:
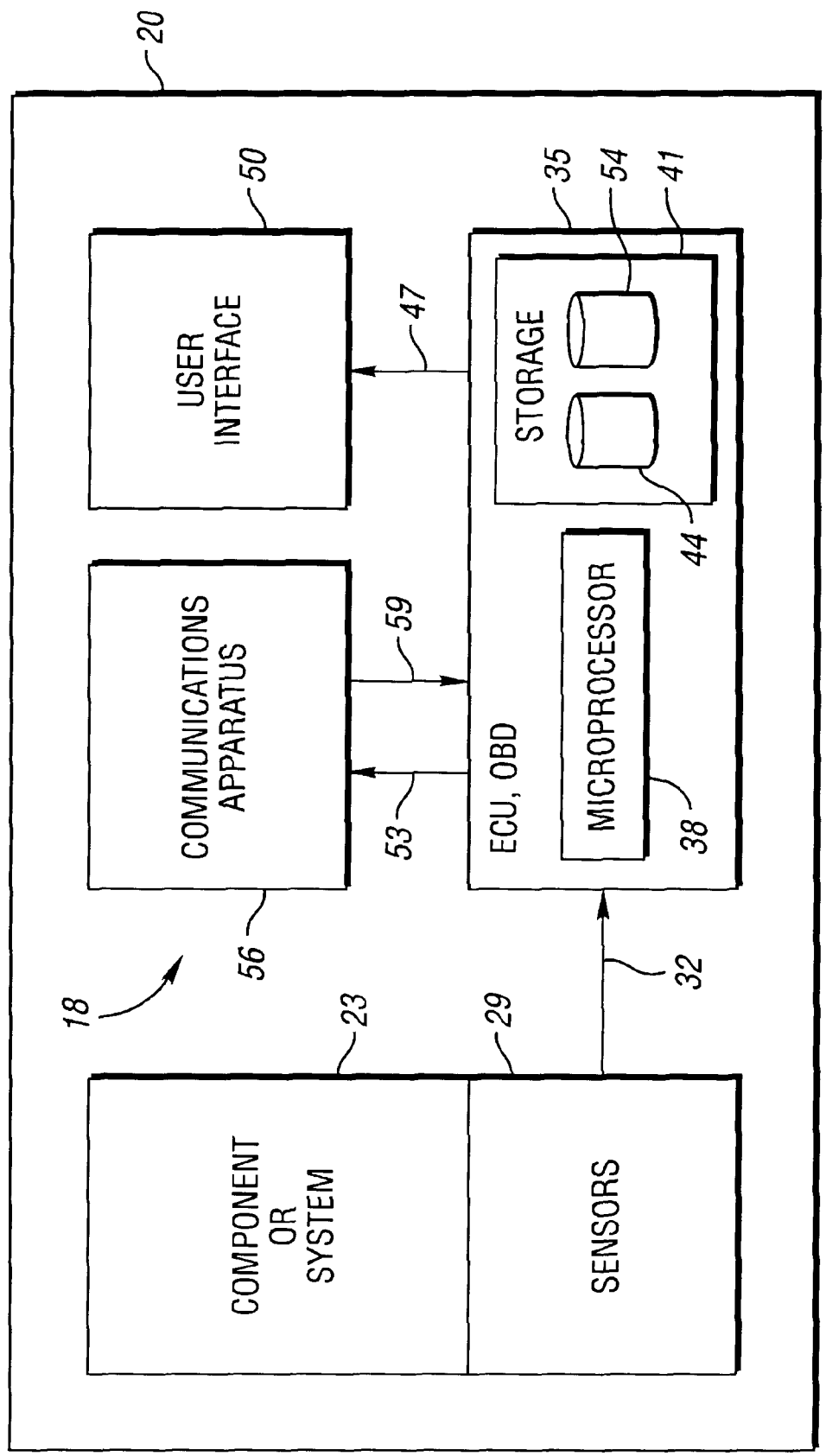
FIG. 1 is a schematic illustration of a vehicle maintenance system in accordance with an aspect of the invention.

FIG. 1 is a schematic depiction of a maintenance system 18 installed in a vehicle 20. The vehicle 20 includes a plurality of components and systems, including a steering system; a braking system; a fuel storage system; an engine; a heating, ventilating and air conditioning system; a battery; a transmission; a motor; an alternator; a fuel pump; a water pump; a regulator; etc. One of the components or systems is a monitored component or system 23 (which may include any of the above listed systems, for example) that has measurable characteristics. Examples of measurable characteristics include duty cycle hours or another measure of the total amount or duration of component or system operation; temperature; angular velocity; vibration; pressure; force; strain; mass or volume flow rate; electric voltage or current; chemical composition of an input or output fluid, etc.

The maintenance system 18 is mounted with respect to the component or system 23, and includes a plurality of sensors 29. The sensors 29 may include voltmeters, position sensors, velocity sensors, acceleration sensors, pressure sensors, force and torque sensors, flow meters, temperature sensors, etc. The sensors 29 are positioned and configured with respect to the monitored component or system 23 to measure, and thereby obtain a value for, at least one of the measurable characteristics of the component or system 23. In the context of the present invention, "measurable characteristics" of the component or system 23 include measurable characteristics of the operating environment of the component or system 23. Thus, measurable characteristics of the component or system 23 include measurable characteristics of the vehicle 20 such as vehicle velocity, vehicle acceleration, vehicle vibration, and vehicle location; measurable characteristics of other vehicle components or systems; and ambient environmental measurable characteristics such as ambient temperature, ambient humidity, etc.

Each of the sensors 29 is configured to transmit a sensor signal 32 indicating the value of one of the measurable characteristics to an electronic control unit 35. The electronic control unit 35 includes a microprocessor 38, a data storage medium 41, and appropriate input and output circuits (not shown) of a known type for receiving various input signals such as the sensor signals 32, and transmitting various output signals. In the embodiment depicted in FIG. 1, the data storage medium 41 is an integral part of the electronic control unit 35. However, and within the scope of the claimed invention, the data storage medium 41 may be a separate unit from the electronic control unit 35.

The microprocessor 38 is configured and programmed to receive the sensor signals 32 indicating the measurable characteristic values and to calculate any calculated measurable characteristic values. Calculated measurable characteristics include characteristics that are derived from more than one sensor, such as brake specific fuel consumption, motor efficiency, or the difference between a component temperature and ambient temperature. Calculated measurable characteristics also include measurable characteristics derived from one or more sensors over time, such as an average value or a range of values.

The data storage medium 41 contains a database 44 with statistical data concerning the potential failure of the component or system 23 with respect to, or as a function of, at least one of the measurable characteristics for which the microprocessor 38 receives sensor signals 32 indicating values, or at least one of the calculated measurable characteristic values. In the context of the present invention, "failure" may include a condition in which the component or system is operable, but repair or maintenance is desirable. For example, "potential failure" may include a condition in which a tune-up or fluid change is necessary for optimum performance. The measurable characteristics with respect to which, or as a function of which, the potential failure of the component or system 23 is described in the statistical data will be referred to hereinafter as "reference parameters." Those skilled in the art will recognize that the statistical data in the database may be stored in a multitude of forms within the scope of the claimed invention, including relational databases, look-up tables, formulae, etc. Preferably, statistical data will describe a failure distribution, such as a Weibull distribution or an exponential distribution, with respect to the at least one reference parameter. For example, the statistical data may include the number of cycles to failure for each of a plurality of similar components or systems; parameters, such as a Weibull shape parameter and characteristic life, that may be used in conjunction with formulae to describe the distribution; etc.

The data storage medium 41 is preferably rewritable so that the statistical data in the database 44 can be selectively updated. In the preferred embodiment, the storage medium 41 is an EEPROM (Electrically Erasable Programmable Read-Only Memory). Programmable ROM is preferred because it is non-volatile and because it is capable of rapid data transfer. However, any storage medium, such as RAM units, magnetic media such as floppy disks, optical media such as writable CD-ROMS, etc, may be used within the scope of the claimed invention. Those skilled in the art will recognize and understand the various methods and devices necessary to program or write to the data storage medium 41.

The microprocessor 38 is further configured and programmed to retrieve the statistical data from the storage medium 41, and to analyze the statistical data and a value of a reference parameter according to stored software to calculate or otherwise determine a numerical indication 47 of the remaining useful life of the monitored component or system 23. The microprocessor preferably employs a probability analysis to determine the numerical indication 47. In the preferred embodiment, the microprocessor 38 employs a Weibull analysis to determine two numerical indications 47 of the remaining useful life of the component or system 23: a present probability of failure based on the present value of the reference parameters, and a predicted time of failure based on mean time to failure.

In the preferred embodiment, a measure of the total amount or duration of component or system operation, such as duty cycle hours, is a reference parameter to ensure that a numerical indication of the remaining useful life of the component or system is determinable at any time in the operating life of the component or system. Other measurable characteristics may not be useful in determining a numerical indication of the remaining useful life until degradation of the component or system results from, or causes, certain values or behavior of the other measurable characteristics.

The microprocessor 38 is operatively connected to a user interface 50 and configured to transmit the numerical indication 47 of the remaining useful life of the component or system 23 to a human vehicle user. In the preferred embodiment, the user interface 50 is a screen located in the passenger space of the vehicle 20.

In the context of the present invention, an "onboard diagnostics system" is any system configured to recognize a predetermined fault condition of a system or component. In the embodiment depicted, the electronic control unit 35 is also part of an onboard diagnostics system. The microprocessor 38 is configured to compare measurable characteristic values from the sensors 29 with stored values or ranges of values to determine if a fault condition exists. Those skilled in the art will recognize and understand the operation of an onboard diagnostics system. Examples of onboard diagnostics systems are described in U.S. Pat. No. 4,277,772, issued Jul. 7, 1981 to Kastura and Enyart, and U.S. Pat. No. 4,271,402, issued Jun. 2, 1981 to Kastura and Stewart, both of which are hereby incorporated by reference in their entireties. Within the scope of the claimed invention, the onboard diagnostics system may be distributed over a plurality of electronic control units or microprocessors.

The maintenance system 18 is configured such that the storage medium 41 stores performance data 53 at predetermined intervals, such as once every 10 seconds, in a database 54. "Performance data" preferably includes values of measurable characteristics; a unique system or component identifier such as a part number; a unique vehicle identifier such as a vehicle identification number; and an indicator of the presence or absence of a predetermined fault condition. The electronic control unit 35 is configured to automatically transmit the stored performance data from the storage medium 41 to a communications apparatus 56 at predetermined intervals or triggering events. Triggering events may include, for example, the presence of a fault condition; the beginning of vehicle operation, such as whenever a vehicle user turns an ignition key to start the vehicle; the completion of vehicle operation, such as whenever a vehicle user turns an ignition key to stop the vehicle, etc. If necessary to reduce the amount of data transmitted, the microprocessor 38 may refine the performance data 53 before transmitting it to the communications apparatus 56. For example, the microprocessor 38 may transmit the maximum value of a measurable characteristic, the minimum value of a measurable characteristic, or the average value of a measurable characteristic between transmissions.

The communications apparatus 56 is configured to transmit the performance data 53 received from the electronic control unit 35 to an offboard network. The communications apparatus 56 is preferably wireless to enable automatic transmission of the stored performance data without geographic constraints. Those skilled in the art will recognize a variety of wireless communications apparatuses that may be employed within the scope of the claimed invention. For example, a vehicle telematics system configured to transmit data via satellite or cellular network may be used. Preferably, the predetermined intervals or triggering events are not limited to the presence of a fault condition to ensure a regular flow of performance data to the offboard network.

The communications apparatus 56 is also configured to receive maintenance system programming data 59 from the offboard network. Programming data 59 includes software and updated or additional statistical data. The microprocessor 38 is preferably reprogrammable with programming data received via the communications apparatus 56 such that the manner in which the microprocessor 38 analyzes a value of the at least one reference parameter and the statistical data to calculate or otherwise determine a numerical indication of the remaining useful life of the component or system 23 is modifiable. Similarly, the database 41 containing the statistical data is preferably rewritable to accommodate updated or additional statistical data received via the communications apparatus 56.

Figure 2:
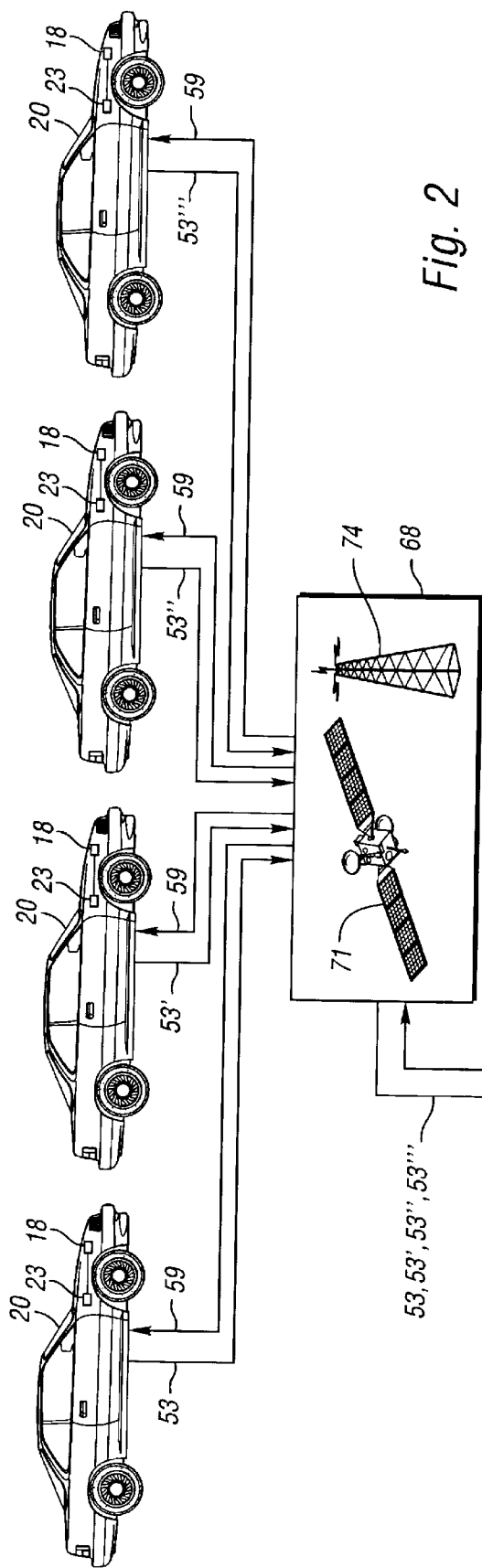
FIG. 2 is a schematic illustration of an apparatus for collection and analysis of performance data from remotely-located components or systems in accordance with another aspect of the invention.
Figure 2:
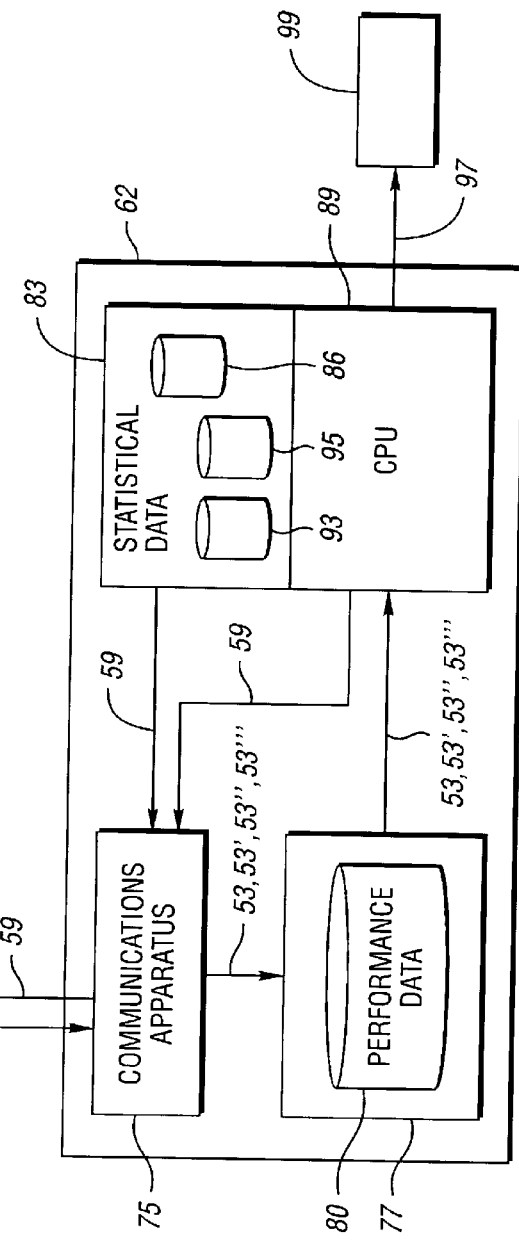

Referring to FIG. 2, wherein like reference numbers refer to like components from FIG. 1, a plurality of remotely-located vehicles 20 each has a monitored component or system 23 monitored by a maintenance system 18. The maintenance systems 18 transmit performance data 53, 53', 53", 53"', including values of at least a first measurable characteristic and a second measurable characteristic of the components or systems 23, to an offboard network 62 via a communications network 68. In the embodiment depicted, the offboard network 62 is an apparatus for the collection and manipulation of performance data. The communications network 68 is preferably wireless and may employ, for example, a satellite system 71 or a cellular telephone system 74. The offboard network 62 includes a communications apparatus 75 configured to receive the performance data 53, 53', 53", 53"'.

A first data storage medium 77 is operatively connected to the communications apparatus 75 and is configured to store the performance data 53, 53', 53", 53"' in a first database 80. A second storage medium 83 is configured to store a plurality of databases each containing a set of statistical data that concerns the potential failure of the components or system 23 with respect to, or as a function of, at least one of the measurable characteristics. A second database 86 is located on the second storage medium 83 and contains a first set of statistical data. In the preferred embodiment, the first set of statistical data concerns the potential failure of the components or systems 23 in each of the remotely-located vehicles 20 with respect to, or as a function of, the first measurable characteristic. In the preferred embodiment, the first measurable characteristic is total duty cycle hours of monitored component or system operation. The first set of statistical data is derived from testing components or systems that are substantially similar to the monitored components or systems 23 in the remotely-located vehicles 20.

The collection of performance data in the first database 80 provides a valuable source of information concerning the behavior of the components or systems 23 in field use. A central processing unit 89 is operatively connected to the first storage medium 77 and the second storage medium 83, and is configured to exploit the performance data in the first database 80.

The central processing unit 89 is programmed and configured to assist in checking the accuracy of the statistical data in the second database 86 by generating from the performance data in the first database 80 a second set of statistical data concerning the potential failure of the components or systems 23 with respect to, or as a function of, the first measurable characteristic. The second set of statistical data may then be stored in one of the storage mediums 77, 83 in a third database 93, or transmitted as programming data 59 to the vehicles 20.

The central processing unit 89 is also programmed to generate from the performance data in the second database 80 a third set of statistical data concerning the potential failure of the components or systems with respect to, or as a function of, the second measurable characteristic. For example, the performance data in the first database 80 may indicate substantially varying rates of failure with respect to duty cycle hours at different average ambient temperatures; the vehicles in colder climates may experience component or system failure prior to vehicles in tropical climates. The third set of statistical data may describe potential failure of the components or systems 23 with respect to, or as a function of, both duty cycle hours of operation and the average ambient temperature. The third set of statistical data may be stored in one of the storage mediums 77, 83, in a fourth database 95, or may be transmitted as programming data 59 to the vehicles 20.

The central processing unit 89 is programmed to assist users of the vehicles 20 by analyzing the value of at least one of the measurable characteristics of a particular component or system 23 and the first, second, or third set of statistical data, and calculating, or otherwise determining, a numerical indication 97 of the remaining useful life of the particular component or system 23. Initially, the central processing unit 89 will employ the first set of statistical data. The central processing unit may employ the second or third set of statistical data after sufficient performance data has been collected and stored. The central processing unit 89 is operatively connected to a user interface 99, and configured to transmit the numerical indication 97 to the user interface 99. Those skilled in the art will recognize a multitude of user interfaces that may be employed within the scope of the claimed invention.

Figure 3:
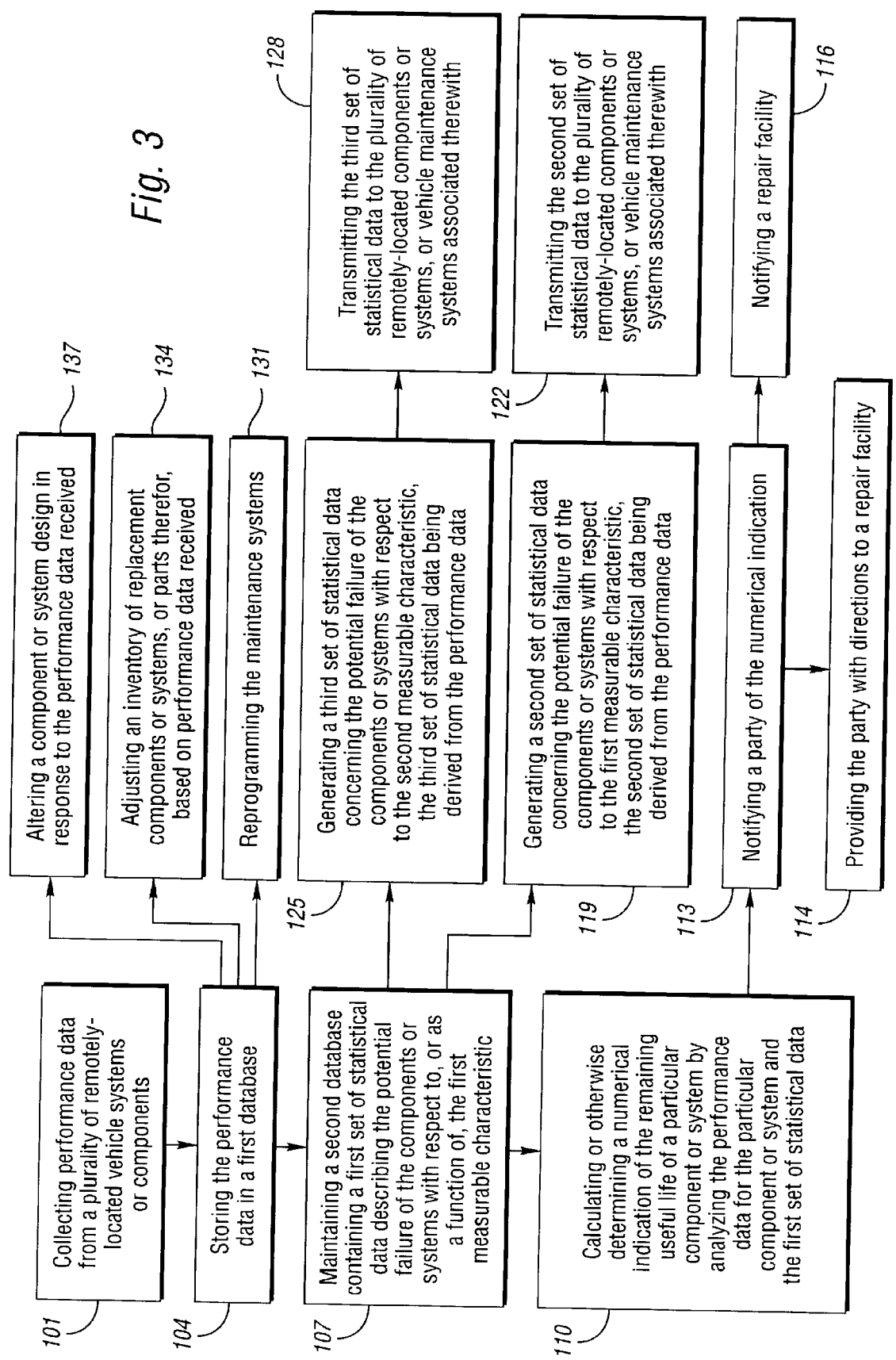
FIG. 3 is a schematic illustration of a method for advantageously collecting and employing performance data from a plurality of remotely-located components or systems in accordance with yet another aspect of the invention.

FIG. 3 is a schematic depiction of a method for advantageously collecting and using performance data from a plurality of remotely-located components or systems. The method comprises collecting performance data from a plurality of remotely-located systems or components at a plurality of increments or predetermined triggering events 101. Each of the components or systems is part of a vehicle. The performance data from each component or system at each increment or triggering event includes a value of a first measurable characteristic of the component or system, a unique component or system identifier, and the presence or absence of a fault condition.

The method also includes storing the performance data in a first database 104 and maintaining a second database containing a first set of statistical data 107. The first set of statistical data describes the potential failure of the components or systems in relation to, or as a function of, the first measurable characteristic. Preferably, the first measurable characteristic is duty cycle hours, or another measure of the total amount or duration of component or system operation. The first set of statistical data is preferably derived from testing of similar components or systems.

The method may include calculating or otherwise determining a numerical indication of the remaining useful life of a particular component or system by analyzing the performance data for the particular component or system and the first set of statistical data 110. Preferably, a probability analysis, such as a Weibull analysis, is employed to calculate or otherwise determine the numerical indication. If the particular component or system is owned by or in the possession of a party, the method may also include notifying the party of the numerical indication of the remaining useful life of the particular component or system 113. Notification of the party could be by electronic mail, telephone, mail, pager service, via the Internet, at a web site, etc. The web site could contain commercial advertising for the party to view while accessing the numerical indication. In the context of the present invention, mail refers to government mail as well as private courier services. Pager service includes notification by an electronic pager, a personal digital assistant, etc.

It may be advantageous to notify the user via a telematics system when the numerical indication indicates that the remaining useful life of the particular component or system is less than a predetermined duration, thereby providing the user with advance notice of a predicted impending failure. Such advance notice may reduce warranty costs by preventing any damage caused by a malfunctioning or nonworking component or system. The method may also include providing directions to a repair facility via the telematics system to the vehicle user 114.

The method may also include notifying a repair shop or other servicing entity of the numerical indication when the numerical indication indicates that the remaining useful life of the particular component or system is less than a predetermined duration 116. Notification of a repair shop or other service entity allows the repair shop or other service entity to prepare for servicing or repairing the component or system. For example, the repair shop or other service entity may then ensure that a replacement component or system is in inventory.

The first set of statistical data is preferably derived from testing of similar components or systems, and may not accurately describe the failure of the components or systems. For example, the testing conditions may not have accurately simulated the conditions in which the components or systems operate in the field, or the testing may have been performed on prototypes that were not identical to mass-produced components or systems used in the vehicles. The performance data may be used to check the accuracy of the first set of statistical data, and may be used to either update or replace the first set of statistical data where the performance data indicates that the first set of statistical data does not accurately describe the behavior of the remotely-located components or systems. Accordingly, the method may further include generating a second set of statistical data concerning the potential failure of the components or systems with respect to, or as a function of, the first measurable characteristic, wherein the second set of statistical data is derived from the performance data in the first database 119. Where the vehicles include a vehicle maintenance system substantially as described in FIG. 1, it may be advantageous to transmit the second set of statistical data to the plurality of remotely-located components or systems or the vehicle maintenance systems associated therewith 128.

The performance data may include the values of a second measurable characteristic. The values of the second measurable characteristic may be useful if they provide an indication of the remaining useful life of the component. For example, the second measurable characteristic may display a unique behavior prior to a failure in the remotely-located components or systems. If so, a third set of statistical data can be generated that concerns the potential failure of the components or systems with respect to, or as a function of, the second measurable characteristic. Accordingly, the method may further include generating a third set of statistical data concerning the potential failure of the component or system with respect to, or as a function of, a second measurable characteristic 125, wherein the performance data collected includes values of the second measurable characteristic, and wherein the third set of statistical data is derived from the performance data in the first database. Where the vehicles have a maintenance system substantially as described in FIG. 1, it may be advantageous for the method to further include transmitting the third set of statistical data to the plurality of remotely located components or systems or the maintenance systems associated therewith 128.

The method may also include reprogramming the microprocessor in each of the plurality of remotely-located vehicles via the communications apparatus in the vehicle 131, to accommodate, for example, a new set of statistical data.

The performance data may also be useful in determining the inventory of replacement components or systems necessary to replace the components or systems. Accordingly, the method may further comprise adjusting an inventory of replacement components or systems, or parts therefor, based on performance data received 134.

The performance data may also indicate that the design of the components or systems may not be optimal. For example, if the components or systems fail prematurely, that is, before the first set of statistical data indicates failure, then the design should be changed to extend the useful lives of the components or systems. Similarly, if the useful lives of the components or systems exceed the useful lives indicated by the first set of statistical data, then the components or systems may be wastefully over-designed. Accordingly, the method may further comprise altering a component or system design in response to the performance data received 137.

The maintenance system, offboard network, and method described herein may be used in conjunction with any component or system that is subject to degradation. For example, components or systems in aircraft, computers, power generation equipment, manufacturing systems, robots, etc, can be monitored by a maintenance system substantially as described herein. Performance data from these components or systems may be collected and exploited substantially as described herein.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

What is claimed is:

1. A maintenance system for a system or component subject to degradation, the maintenance system comprising:
   a sensor configured and positioned with respect to the component or system to measure, and thereby obtain a value for, the measurable characteristic, and transmit a signal indicating the value;
   at least one data storage medium;
   a database located on said at least one storage medium, the database containing statistical data describing a failure distribution for the component or system with respect to, or as a function of, the measurable characteristic;
   a microprocessor operatively connected to the sensor and said at least one storage medium, configured to receive the value of the measurable characteristic indicated by the sensor, configured to retrieve the statistical data from said at least one storage medium, and programmed to analyze in a first predetermined manner the value of the measurable characteristic and the statistical data to calculate or otherwise determine an indication of the remaining useful life of the component or system; and
   an interface for the microprocessor configured to transmit the indication of the remaining useful life of the component or system.

2. The maintenance system of claim 1, further comprising:
   a diagnostics system operatively connected to the component or system and configured to recognize a predetermined fault condition; and
   a communications apparatus;
   wherein the sensor is operatively connected to said at least one storage medium, said at least one storage medium being configured to store a value of the measurable characteristic at predetermined time intervals;
   wherein the diagnostic system is operatively connected to said at least one storage medium, said at least one storage medium configured to retain an indicator of the presence or absence of the predetermined fault condition at the predetermined time intervals; and
   wherein the wireless communications apparatus is operatively connected to said at least one storage medium and configured to transmit the value stored in said at least one storage medium, the indicator of the presence or absence of the predetermined fault condition, and a unique identifier of the component or system to a remote data collection device.

3. The maintenance system of claim 2, wherein the database is rewritable via the communications apparatus to update the statistical data.

4. An apparatus for the collection and manipulation of performance data from a plurality of monitored vehicular components or systems having a measurable characteristic and being on respective ones of a plurality of remotely located vehicles, the performance data from each of the plurality of monitored vehicular components or systems including a value of the measurable characteristic, the presence or absence of a predetermined fault condition and a unique identifier of the component or system from which the performance data is received, the apparatus comprising:
   a communications apparatus configured to receive the performance data from the plurality of monitored vehicular components or systems;
   at least one data storage medium operatively connected to the communications apparatus and configured to store the performance data in a first database; and
   a processing unit operatively connected to the first database and programmed to generate from the performance data in the first database a first set of statistical data describing a failure distribution of the plurality of monitored components or systems with respect to, or as a function of, the measurable characteristic.

5. The apparatus of claim 4, wherein the plurality of monitored vehicular systems or components are one of steering systems; braking systems; fuel storage systems; engines; heating, ventilating and air conditioning systems; batteries; transmissions; motors; alternators; fuel pumps; water pumps; and regulators.

6. The apparatus of claim 5, further comprising:
   a second database located on said at least one data storage medium, the second database containing a second set of statistical data concerning the potential failure of the components or systems with respect to the measurable characteristic and derived or obtained from testing of similar components or systems;
   wherein the processing unit is operatively connected to the second database and the first database, and configured to analytically compare the performance data to the second set of statistical data in the second database.

7. The apparatus of claim 4, wherein the processing unit is configured to transmit at least part of the first set of statistical data to each of the plurality of vehicles via the communications apparatus.

8. A maintenance system lot a vehicle having a component or system with a measurable characteristic, the maintenance system comprising:
   a sensor configured and positioned with respect to the component or system to measure, and thereby obtain a value for, the measurable characteristic, and transmit a signal indicating the value;
   at least one data storage medium;
   a database located on said at least one storage medium, the database containing statistical data describing a failure distribution for the component or system with respect to, or as a function of, the measurable characteristic;

a microprocessor operatively connected to the sensor and said at least one storage medium, configured to receive the value of the measurable characteristic indicated by the sensor, configured to retrieve the statistical data from said at least one storage medium, and programmed to analyze in a first predetermined manner the value of the measurable characteristic and the statistical data to calculate or otherwise determine an indication of the remaining useful life of the component or system; and an interface for the microprocessor configured to transmit the indication of the remaining useful life of the component or system.

9. The maintenance system of claim 8, wherein the measurable characteristic is the total amount or duration of component operation; and wherein the microprocessor employs a probability analysis to calculate or otherwise determine the indication of the remaining useful life of the component or system.

10. The maintenance system of claim 8, further comprising: an onboard diagnostics system operatively connected to the component or system and configured to recognize a predetermined fault condition; and a communications apparatus;

wherein the sensor is operatively connected to said at least one storage medium, said at least one storage medium being configured to store a value of the measurable characteristic at predetermined time intervals;

wherein the onboard diagnostic system is operatively connected to said at least one storage medium, said at least one storage medium configured to retain an indicator of the presence or absence of the predetermined fault condition at the predetermined time intervals; and wherein the wireless communications apparatus is operatively connected to said at least one storage medium and configured to transmit the value stored in said at least one storage medium, the indicator of the presence or absence of the predetermined fault condition, and a unique identifier of the component or system to an offboard network.

11. The maintenance system of claim 10, wherein the microprocessor is reprogrammable via the communications apparatus such that the microprocessor analyzes in a second predetermined manner the value of the measurable characteristic and the statistical data to calculate an indication of the remaining useful life of the component or system.

12. The maintenance system of claim 10, wherein the component or system is one of a steering system; a braking system; a fuel storage system; an engine; a heating, ventilating and air conditioning system; a battery; a transmission; motors; an alternator; a fuel pump; a water pump; and a regulator.

13. The maintenance system of claim 10, wherein the database is rewritable via the communications apparatus to update the statistical data.

14. An apparatus for the collection and exploitation of performance data from a plurality of monitored vehicular components or systems each having a measurable characteristic and being on respective ones of a plurality of remotely located vehicles, the performance data from each of the plurality of monitored vehicular components or systems including a value of the measurable characteristic, the presence or absence of a predetermined fault condition and a unique identifier of the component or system from which the performance data is received, the apparatus comprising:

a communications apparatus configured to receive the performance data from the plurality of monitored vehicular components or systems;

at least one data storage medium operatively connected to the communications apparatus and configured to store the performance data in a first database; and a processing unit operatively connected to the first database, programmed to generate from the performance data in the first database a set of statistical data concerning the potential failure of the components or systems in relation to, or as a function of, the measurable characteristic, and programmed to maintain a second database on said at least one data storage medium containing the set of statistical data.

15. A method of exploiting performance data, the method comprising:

collecting performance data from a plurality of remotely-located components or systems that are subject to degradation, at a plurality of time increments or predetermined triggering events, the performance data from each component or system at each increment or triggering event including a value of a first measurable characteristic of the component or system, a unique component or system identifier, and the presence or absence of a fault condition;

storing the performance data in a first database; and maintaining a second database containing a first set of statistical data concerning the potential failure of the components or systems in relation to, or as a function of, the first measurable characteristic.

16. The method of claim 15, further comprising calculating or otherwise determining an indication of the remaining useful life of a particular component or system by analyzing the performance data of the particular component or system and the first set of statistical data.

17. The method of claim 16, wherein the particular component or system is owned by or in the possession of a party, and the method further comprises notifying the party of the indication of the remaining useful life of the particular component or system.

18. The method of claim 15, further comprising generating a second set of statistical data concerning the potential failure of the components or systems with respect to, or as a function of, the first measurable characteristic, wherein the second set of statistical data is derived from the performance data in the first database.

19. The method of claim 18, wherein each of the plurality of remotely-located components or systems is operatively connected to a maintenance system;

wherein each maintenance system includes a rewritable storage medium and a communications apparatus operatively connected to the storage medium and configured to transmit statistical data to the rewritable storage medium;

wherein each maintenance system is configured to analyze a set of statistical data stored in the storage medium and a value of the first measurable characteristic from the component or system to which the maintenance system is operatively connected to calculate or otherwise determine an indication of the remaining useful life of the component or system to which the maintenance system is operatively connected;

wherein the method further comprises transmitting at least part of the second set of statistical data to each of the maintenance systems.

20. A method of exploiting performance data, the method comprising:

collecting performance data from a plurality of remotely-located components or systems, each of the plurality of remotely-located components or systems being part of a vehicle, at a plurality of time increments or predetermined triggering events, the performance data from each component or system at each increment or triggering event including a value of a first measurable characteristic of the component or system, a unique component or system identifier, and the presence or absence of a fault condition;

storing the performance data in a first database; and maintaining a second database containing a first set of statistical data concerning the potential failure of the components or systems in relation to, or as a function of, the first measurable characteristic.

21. The method of claim 20, further comprising calculating or otherwise determining an indication of the remaining useful life of a particular component or system by analyzing the performance data of the particular component or system and the first set of statistical data.

22. The method of claim 21, wherein the particular component or system is owned by or in the possession of a party, and the method further comprises notifying the party of the indication of the remaining useful life of the particular component or system.

23. The method of claim 22, wherein the notification of the party is by electronic mail.

24. The method of claim 22, wherein the notification of the party is by telephone.

25. The method of claim 22, wherein the notification of the party is by mail.

26. The method of claim 22, wherein the notification of the party is by an electronic paging system.

27. The method of claim 1, further comprising making available the indication via the Internet.

28. The method of claim 27, wherein the indication is accessible at a web site, and wherein the website includes commercial advertising.

29. The method of claim 21, wherein the indication indicates that the remaining useful life of the particular component or system is less than a predetermined duration, and further comprising notifying a repair shop or other servicing entity of the indication.

30. The method of claim 21, wherein the indication indicates that the remaining useful life of the particular component or system is less than a predetermined duration, wherein the vehicle of which the particular component or system is a part is equipped with a telematics system, and the method further comprises notifying a user of a potential component or system failure via the telematics system.

31. The method of claim 30, further comprising providing directions to a repair facility via the telematics system to the vehicle user.

32. The method of claim 20, further comprising generating a second set of statistical data concerning the potential failure of the components or systems with respect to, or as a function of, the first measurable characteristic, wherein the second set of statistical data is derived from the performance data in the first database.

33. The method of claim 32, wherein each of the plurality of remotely-located components or systems is operatively connected to a vehicle maintenance system;

wherein each vehicle maintenance system includes a rewritable storage medium and a communications apparatus operatively connected to the storage medium and configured to transmit statistical data to the rewritable storage medium;

wherein each vehicle maintenance system is configured to analyze a set of statistical data stored in the storage medium and a value of the first measurable characteristic from the component or system to which the maintenance system is operatively connected to calculate or otherwise determine an indication of the remaining useful life of the component or system to which the maintenance system is operatively connected;

wherein the method further comprises transmitting at least part of the second set of statistical data to each of the maintenance systems.

34. The method of claim 20, wherein the performance data from each component or system includes a value of a second measurable characteristic, and the method further comprises generating a second set of statistical data concerning the potential failure of the component or system with respect to, or as a function of, the second measurable characteristic, wherein the second set of statistical data is derived from the performance data in the first database.

35. The method of claim 34, wherein each of the plurality of remotely-located components or systems is operatively connected to a vehicle maintenance system;

wherein each vehicle maintenance system includes a rewritable storage medium and a communications apparatus operatively connected to the storage medium and configured to transmit statistical data to the rewritable storage medium;

wherein each vehicle maintenance system is configured to analyze a set of statistical data stored in the storage medium and a value of the second measurable characteristic from the component or system to which the maintenance system is operatively connected to calculate or otherwise determine an indication of the remaining useful life of the component or system to which the maintenance system is operatively connected;

wherein the method further comprises transmitting at least part of the second set of statistical data to each of the maintenance systems.

36. The method of claim 20, wherein each of the plurality of remotely-located components or systems is operatively connected to a vehicle maintenance system;

wherein each vehicle maintenance system includes at least one rewritable storage medium configured to store software and statistical data; and a communications apparatus operatively connected to said at least one rewritable storage medium and configured to transmit software to said at least one rewritable storage medium;

wherein each vehicle maintenance system is configured to analyze, according to software stored in said at least one storage medium, a set of statistical data stored in said at least one storage medium and a value of the first measurable characteristic from the component or system to which the maintenance system is operatively connected to calculate or otherwise determine an indication of the remaining useful life of the component or system to which the maintenance system is operatively connected;

wherein the method further comprises reprogramming at least one of the maintenance systems by transmitting software to the at least one maintenance system.

37. The method of claim 20, further comprising adjusting an inventory of parts based on performance data received.

38. The method of claim 20, further comprising altering a component or system design in response to the performance data received.

* * * * *